(12) United States Patent
Plank et al.

(10) Patent No.: US 7,264,838 B2
(45) Date of Patent: Sep. 4, 2007

(54) METHOD FOR REDUCING ACRYLAMIDE LEVELS IN FOOD PRODUCTS AND FOOD PRODUCTS PRODUCED THEREBY

(75) Inventors: David W. Plank, Taylors Falls, MN (US); Douglas J. Novak, Big Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 307 days.

(21) Appl. No.: 10/641,697

(22) Filed: Aug. 15, 2003

(65) Prior Publication Data

US 2005/0037123 A1 Feb. 17, 2005

(51) Int. Cl.
*A21D 10/02* (2006.01)
*A21D 2/24* (2006.01)

(52) U.S. Cl. ...................... 426/549; 426/653
(58) Field of Classification Search .................. 426/94, 426/549, 653
See application file for complete search history.

(56) References Cited

U.S. PATENT DOCUMENTS

| | | | | |
|---|---|---|---|---|
| 4,005,225 | A | * 1/1977 | Craig et al. | 426/21 |
| 4,448,791 | A | * 5/1984 | Fulde et al. | 426/94 |
| 5,262,182 | A | * 11/1993 | Kasahara et al. | 426/19 |
| 6,896,916 | B2 | * 5/2005 | Cooper | 426/20 |
| 7,037,540 | B2 | * 5/2006 | Elder et al. | 426/52 |

* cited by examiner

*Primary Examiner*—Arthur L. Corbin
(74) *Attorney, Agent, or Firm*—John A. O'Toole; Everett G. Diederiks, Jr.; Douglas J. Taylor

(57) ABSTRACT

The present invention relates to a novel treatment composition for use in treating food products and food intermediates. The treatment composition may be used in single, home use settings as well as commercial applications for larger scale treatment of food products in the course of manufacture. The treatment composition of the present invention uses a primary amine, such as the amino acid lysine or combinations of amino acids and modified derivatives thereof in order to limit the formation of acrylamide in food products and food intermediates without sacrificing taste or other organoleptic properties of the food product.

3 Claims, 1 Drawing Sheet

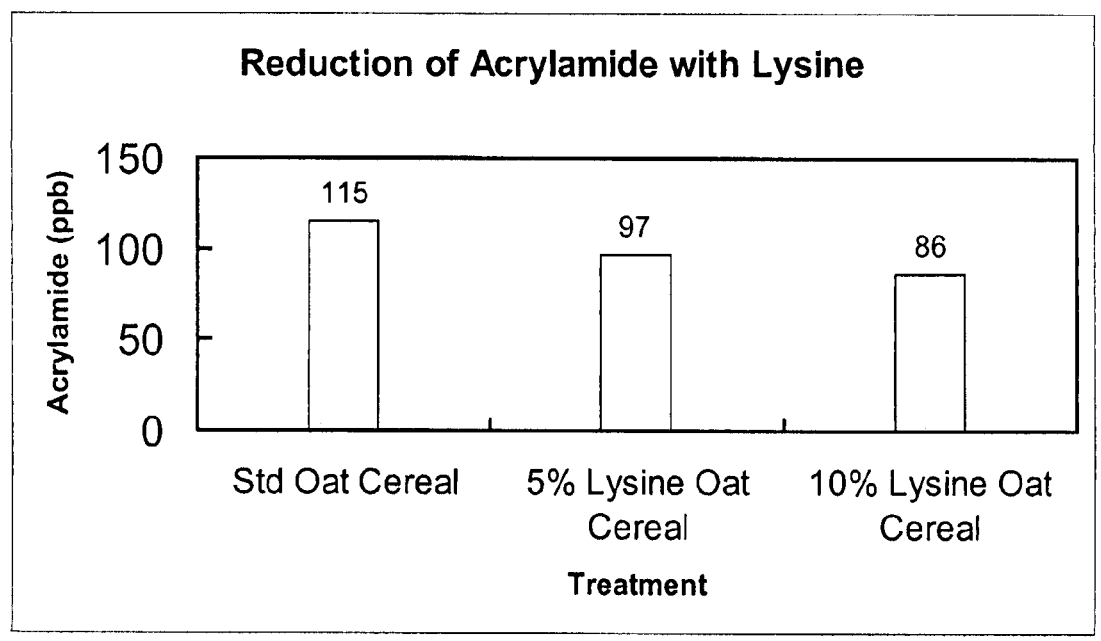

METHOD FOR REDUCING ACRYLAMIDE LEVELS IN FOOD PRODUCTS AND FOOD PRODUCTS PRODUCED THEREBY

CROSS-REFERENCES TO RELATED APPLICATIONS

None.

FIELD OF THE INVENTION

The present invention relates to a novel treatment composition for use in treating food products and food intermediates. The treatment composition may be used in single, home use settings as well as commercial applications for larger scale treatment of food products in the course of manufacture. The treatment composition of the present invention uses a primary amine, such as the amino acid lysine or combinations of amino acids and modified derivatives thereof in order to limit the formation of acrylamide in food products and food intermediates without sacrificing taste or other organoleptic properties of the food product.

BACKGROUND OF THE INVENTION

Acrylamides have been classified as a potential carcinogen and neurotoxin that has been recently discovered to exist in varying levels in processed foods, such as fried, baked and cooked foods that are made from grain and vegetable based products such as potatoes. It has been proposed that acrylamide is formed as a result of the Maillard reaction between amino acids and reducing sugars. Asparagine, a major amino acid found in cereals (grains) and potatoes is thought to be the significant player in acrylamide production.

The Maillard reaction is responsible for producing much of the color and flavor in processed foods, such as those produced during the typical heating, cooking, frying, baking or roasting steps that accompany the production of breads, cereals, potato snacks, pastries, etc.

Asparagine has an amide group attached to a chain of two carbon atoms. The degradation of the amino acids in the presence of dicarbonyl products from the Mailard reaction causes the amino acid to become decarboxylated and deaminated to create an aldehyde. When glucose and asparagines are reacted at elevated temperatures, particularly those above 100° C., more typically above 120° C. and usually above 185° C. significant levels of acrylamides may be produced.

The challenges that face food manufacturers with respect to the reduction of acrylamide levels in food products is especially keen in connection with recent studies that point to possible detrimental health affects associated with the presence of elevated acrylamide levels. As such, manufacturers need to look for new ways to reduce acrylamide levels in food products without adversely affecting the form, function and performance of food products while simultaneously avoiding increasing cost associated with adding other ingredients to such food products.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Surprisingly, it has been found that through the addition of amino acids to dough used in preparing food products or food intermediates, asparagines can be inhibited from reacting with reducing ends resulting in a food product or food intermediate having reduced acrylamide levels when compared with food products and food intermediates prepared in without the inclusion of such additional amino acids.

In one embodiment of the present invention, a method for producing food products having reduced acrylamide levels, is disclosed and includes the steps of initially preparing dough for use in forming a food product or food intermediate; then adding an amino acid to said dough and mixing the dough with amino acid. Next, the dough is heated so as to undergo a Mailard reaction. Finally, the food product or food intermediate is distributed to end users or consumers.

In a still further embodiment of the present invention, a food product or food intermediate having reduced acrylamide levels, after cooking, baking, frying, heating and combinations thereof, is described and includes a dough suitable for use in preparing a food product or food intermediate, and an amount of amino acid selected from a group including lysine, isoleucine, phenylalanine, tyrosine, cysteine, cystine, leucine, methionine, serine, threonine, glutamate, aspartate, proline, tryptophan, valine; alanine, glycine, arginine and histidine as well as combinations thereof.

In yet a still further embodiment of the present invention, a method of communicating a beneficial effect of a food product having reduced acrylamide levels, is described and includes the steps of initially providing a food product having an amount of an amino acid selected from a group including lysine, isoleucine, phenylalanine, tyrosine, cysteine, cystine, leucine, methionine, serine, threonine, glutamate, aspartate, proline, tryptophan, valine; alanine, glycine, arginine and histidine as well as combinations thereof, then packaging the food product and producing a message relating to the food product and its reduced acrylamide levels. Next, the food product is distributed to consumers for consumption and the message is communicated.

These, as well as other objects and advantages of this invention, will be more completely understood and appreciated by referring to the following more detailed description of the presently preferred exemplary embodiments of the invention.

BRIEF DESCRIPTION OF THE DRAWINGS

FIG. 1 is a chart depicting the reduction of acrylamide in three samples.

DETAILED DESCRIPTION OF THE INVENTION

The present invention is now illustrated in greater detail by way of the following detailed description, but it should be understood that the present invention is not to be construed as being limited thereto.

As used herein a food product and/or food intermediate may include an additive, component, supplement or ingredient useful in preparing or supplementing a food, or a food intermediate, a fully prepared composition but in a raw state (requiring a further treatment step prior to consumption, such as baking dough to produce bread) or a finished food product that is ready to eat. Food products and food intermediates as provided hereunder generally include any food products or food intermediates derived from or containing grain, cereal or vegetable based components. Food products may also include nutritional beverages and energy drinks.

As used food product that are provided in a finished state or arising out of an intermediate include but are not limited to baked goods, muffins, rolls, cakes, pies, crackers, toaster pastries, pastries, grain based bars, granola bars, health food bars, breads, cereals, fruit snacks, fruit bars, pizza rolls, soups, pasta, yogurt, pudding, beverages, sauces, snacks, potato crisps, French fries, corn chips, tortilla chips, extruded snacks, enrobed extruded snacks, pretzels, popcorn, rice and corn cakes, fried and processed foods and generally any food products or food intermediates derived from or containing grain, cereal or vegetable based components.

As previously indicated, asparagine has an amide group attached to a chain of two carbon atoms. The degradation of the amino acids in the presence of dicarbonyl products from the Mailard reaction causes the amino acid to become decarboxylated and deaminated to create an aldehyde. When glucose and asparagines are reacted at elevated temperatures, particularly those above 100° C., more typically above 120° C. and usually above 185° C. significant levels of acrylamides may be produced.

Lysine is considered one of the essential amino acids and has a chemical structure of NH2(CH2)4CH(NH2)COOH. CAS number 56-87-1. Lysine is generally a colorless crystal that is soluble in water, slightly soluble in alcohol and insoluble in ether. Lysine can be extracted from natural proteins; created synthetically by fermentation of glucose or other carbohydrates; or by synthesis from caprolactam. Other available forms of lysine include DL-Lysine and L-Lysine monohydrocholoride. However, it should be understood that the present invention is not so limited and that any other amine or amino acid may be used. Exemplary amino acids include lysine, isoleucine, phenylalanine, tyrosine, cysteine, cystine, leucine, methionine, serine, threonine, glutamate, aspartate, proline, tryptophan, valine; alanine, glycine, arginine and histidine as well as combinations and derivatives thereof.

While not wishing to be bound to any particular theory, it has been discovered that by adding a compound containing one or more amino acids or combinations thereof, in an amount ranging from about 0.01% to about 50% by weight and more preferably between about 2% and about 20% by weight and still more preferably between 5 and 10% by weight, the asparagines can be competitively displaced from reacting with the reducing ends of asparagines thereby resulting in decreased acrylamide levels in the final food product or food intermediate product. The reactivity of the amine can be modified by changes in the pH, ion concentration and temperature. It is believed that by using amines for inhibition standard browning and flavor development processes can still be utilized to make a product similar to that to which the additional amines had not been added. That is, the product with the amines added would not differ significantly from products prepared without the additional amine levels.

In an exemplary embodiment in the preparation of a light colored cooked cereal composition such as a cereal dough or a cereal mass, a cooked cereal dough can be prepared by blending various dry cereal ingredients together with water and cooking to gelatinize the starchy components so as to develop a cooked flavor. A pre-blend of wet ingredients may be prepared and combined with a pre-blend of the dry ingredients. The cooked cereal material or mass can also be mechanically worked to form cooked cereal dough. The cooking and mechanical work can occur simultaneously or sequentially. The dry ingredients can also include various cooked cereal dough additives such as sugar(s), salt and mineral salts, and starches. In addition to water, various liquid ingredients such as malt syrups can be added. A cooked cereal mash is quite similar to cooked cereal dough except that larger sized particles such as whole grains or cut grains are cooked rather than cereal flour ingredients.

While the invention finds particular suitability for use in connection with the provision of ready to eat ("R-T-E") cereals fabricated from cooked cereal doughs, the skilled artisan will appreciate that the present cooked cereal doughs can find applicability for use in connection with other grain based food products such as grain and vegetable based snack products. For example, the cooked cereal doughs can be formed into suitably sized, shaped and partially dried pellets or intermediates. These intermediates are useful in forming finished products. Finished grain or vegetable based snack products are usually provided by the deep fat frying or other puffing of the pellets (e.g., hot air or microwave heating) of partially dried intermediate products fabricated from cooked cereal doughs.

An advantage of producing intermediates is that they can be produced in bulk in one location and thereafter fried in one or more finish operations to form the finished snack products. Not only are shipping costs reduced due to the reduced volume of the intermediates compared to the finished products but also breakage of the finished product is reduced.

The cereal dough cooking step can be practiced using a batch, atmospheric cooker and a low pressure extruder cooker especially those equipped with a conditioner pre-cooker, or a twin screw extruder. The cereal dough is cooked with steam and sufficient amounts of added water for times and at temperatures sufficient to gelatinize the cereal starch and to develop desired levels of cooked cereal flavor.

The present exemplary method, for purposes of illustration, comprises the step of forming the cooked cereal dough or mass into individual pieces of a predetermined, desirable shape and size and having a particular moisture content. Conventional techniques and equipment can be employed to practice this step and the skilled artisan will have no difficulty in selecting those suitable for use herein.

For example, the dough having a moisture content of about 25% to 30% is first partially dried to a partially dried dough having a moisture content of about 12% to 20%. The partially dried dough can then be fed to piece forming apparatus that forms the partially dried dough into individually shaped and sized pieces.

The present cereal compositions can be fabricated into any of a variety of common R-T-E cereal or snack forms including, shreds, biscuits, flakes, rings, or any common R-T-E cereal or cereal based snack product form, shape or size.

The present cereal compositions can also be formulated and fabricated so as to provide puffed cereals of various shapes and sizes such as "biscuits". Especially desirable for use herein are biscuits, especially toasted biscuits. With respect to flakes, the forming step can first involve a sub-step of shaping the dough into pellets and then a finish step of shaping the pellets into a final desired shape such as flakes. Shaped or puffed cereals may be extruded through a puffing device or extruded through dies.

The cooked cereal dough can be fed to a pellet former to form pellets. In the preparation of R-T-E cereals in flake form, for example, the pellets can be sized to have a pellet count of about 35 to 50 per 10 g and a moisture content of 16 to 20%. In the preparation of a flaked R-T-E cereal, the pellets can be partially dried to moisture contents of about 18 to 20%. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

The dough can also be sheeted to form sheets of dough (e.g., 25 to 800 microns in thickness) and the individual pieces formed by cutting the sheet into individual pieces or by stamping out shaped pieces from the dough sheet.

The cooked cereal dough may also be extruded through a die imparting a desired peripheral shape to form an extrudate cooked cereal dough rope. The dough rope can be cut to form individual shaped pieces. In another variation, the cooked cereal dough is formed into individual "0" shaped pieces or rings, biscuits, shreds, figurines, letters, spheres or flakes or other geometric shapes, nuggets, or even irregular shapes.

Next, the shaped and sized individual pieces are dried to form finished cereal products. The skilled artisan will appreciate that the drying step depends importantly in part upon the desired end product. For example, for end products in the form of puffable intermediates or pellets for snack production, the drying step can be practiced to provide a "finish" moisture content of about 10 to 15%. However, when the desired end product is an R-T-E cereal, drying the pellets to these moisture contents may only be an intermediate or sub-step prior to, for example, flaking the dried pellets to form "wet" flakes. These "wet" flakes can then be subjected to a finish or final drying step wherein the pieces are dried to final dried moisture contents of 1 to 4% such as by toasting.

In another variation, the dough can be extruded under conditions of temperature and pressure so as to puff and expand (the "direct expansion" technique) and sectioned or cut into individual pieces to form individual expansions puffed R-T-E cereal or snack pieces. The cooked cereal dough can be puffable such as by deep fat frying, microwave heating, gun puffing, jet zone heating, etc. to prepare snack products.

The drying step can also involve heating the pieces under conditions that not only dry the piece but also cause the piece to expand to form dried and puffed or flaked finished pieces. For example, pellets can be gun puffed to form dried puffed R-T-E cereal products. The wet flakes can be toasted to dry, expand and tenderize to form finished R-T-E cereal flakes.

The pieces or pellets may also be deep fat fried to form dried puffed fried finished cereal products. Such dried puffed fried finished cereal pieces are especially desirable as snack products. Such products can absorb about 5 to 35% of frying fat during the drying and puffing step.

As indicated previously, the step of drying, toasting, heating, cooking, frying or other steps of imparting heat to the product results in the grain or vegetable based product developing its flavor and color attributable to the end product, i.e. the Mailard reaction. The degradation of the amino acids, asparagines, in the presence of dicarbonyl products from the Mailard reaction causes the amino acid to become decarboxylated and deaminated to create an aldehyde. When glucose and asparagines are reacted at elevated temperatures, particularly those above 100° C., more typically above 120° C. and usually above 185° C. significant levels of acrylamides may be produced.

An exemplary oat cereal mixture was prepared in accordance with the following illustrative conditions.

EXAMPLE 1

In an exemplary embodiment of the present invention, the food product, in this case a ready to eat (RTE) cereal, may include the following micro and macronutrients in connection with an amount ranging from about 5 to about 10% lysine by weight was added. The serving size ranges from 30 to 55 grams.

| Recommended Daily Value ("DV") | |
|---|---|
| Total Fat | 5% |
| Saturated Fat | 3% |
| Cholesterol | 0% |
| Sodium | 10% |
| Potassium | 5% |
| Total Carbohydrate | 14% |
| Dietary Fiber | 17% |
| Protein | 10% |
| Vitamin A | 10% |
| Vitamin C | 70% |
| Calcium | 0% |
| Iron | 80% |
| Vitamin D | 10% |
| Vitamin E | 100% |
| Thiamin | 100% |
| Riboflavin | 80% |
| Niacin | 80% |
| Vitamin B6 | 80% |
| Folic Acid | 100% |
| Vitamin B12 | 100% |
| Phosphorus | 15% |
| Magnesium | 10% |
| Zinc | 80% |
| Copper | 4% |

This example is based on a 2,000 calorie diet and other food products such as cereal bars, fruit snacks, diary and bakery products, baking mixes and ready to eat meals may contain additional vitamins, nutrients and or minerals as well as potentially varying amounts of the macro and micro nutrients set forth in the instant example.

The RTE cereals of the preceding example was prepared in a conventional manner, mixing the ingredients, with lysine, to produce a food intermediate, here a dough. This exemplary RTE cereal is in the form of puffed "O's" that are created by preparing a cooked cereal dough through known methods and then forming the cooked cereal dough into pellets that have a desired moisture content. The pellets are then puffed into the desired shape. The toasting causes a final drying of the shaped cereal pieces, resulting in slightly expanded and crisp RTE shaped pieces. The shaped pieces are then screened for size uniformity. The final cereal attributes of appearance, flavor, texture, inter alia, are all affected by the selection and practice of the steps employed in their methods of preparation.

The oat cereal of the foregoing example was prepared in accordance with large bowl standard brabender conditions.

Brabender

| | |
|---|---|
| Temperature | 115 degrees C. |
| Time at 100 rpm | 45 Minutes |
| Target Moisture | 31% |

Macroni Press

| | | |
|---|---|---|
| Ram speed | 22 seconds to barrel opening | |
| Knife speed | 410 RPM | 300 RPM |
| Insert | Large | |
| Die | 16 hole 5/16" | 32 hole 3/16" |
| Target pellet count | 150 | |

Tray Dryer

| | |
|---|---|
| Time | 60 minutes |
| Temperature | 212 degrees F. |
| Target Moisture | 9–11% |

Scalper

| | |
|---|---|
| #4 Screen | .187" opening |
| #6 Screen to remove fines | |

Hot Air Popper

| | |
|---|---|
| Batch size | Puff 20 g at a time |
| Transformer Setting | 89 |
| Temperature | 420 degrees F. |
| Time | 30 seconds |
| Puff pellets that go through #4 and stay on #6 | |

Density

Sample of 30 grams of puffed product in a 100 ml. Volumetric cylinder.

An analysis was conducted and the following results obtained in the exemplary tables provided below.

TABLE 1

SMALL SCALE PUFF (SSP) - CHOPA [LARGE BOWL]
Standard formula and procedure
Notebook Number: 10155-121002std (STD)

| Code | Ingredient | % mix | % dough | Large Bowl grams | Ingredient Name | Ingredient moisture | moisture contribution |
|---|---|---|---|---|---|---|---|
| 5170 | oat flour** | 81.951% | 81.95% | 266.75 | oat flour** | 10.0% | 8.2% |
| 3828 | wheat starch # 41 | 3.961% | 3.96% | 12.89 | wheat starch # 41 | 11.0% | 0.4% |
| 4176 | sugar | 3.382% | 3.38% | 11.01 | sugar | 0.1% | 0.0% |
| 1861 | salt | 1.737% | 1.74% | 5.65 | salt | 0.1% | 0.0% |
| 2820 | calcium carbonate | 0.816% | 0.82% | 2.66 | calcium carbonate | 0.0% | 0.0% |
| 2879 | trisodium phosphate | 0.408% | 0.41% | 1.33 | trisodium phosphate | 0.0% | 0.0% |
| 3776 | FloJel G | 6.999% | 7.00% | 22.78 | FloJel G | 11.0% | 0.8% |
| 5211 | Oat Fiber #2 | 0.746% | 0.75% | 2.43 | Oat Fiber #2 | 3.0% | 0.0% |
| | TOTAL DRY MIX | 100.000% | 100.00% | 325.50 | | | |
| | WATER** | | 32.00% | 153.18 | WATER** | 100.0% | 32.0% |
| | Total Dough weight | 100.000% | | 478.68 | calculated dough moisture = | | 41.4% |

**Oat Flour is measured on a 10% moisture basis. Water is adjusted according to the actual amount of oat flour scaled. See separate sheet for amount of water and oat flour to use at any oat flour moisture.

TABLE 2

SMALL SCALE PUFF (SSP) - CHOPA [LARGE BOWL]
Standard formula and procedure
Notebook Number: 10155-121002var1 (Var1)

| Code | Ingredient | % mix | % dough | Large Bowl grams | Ingredient Name | Ingredient moisture | moisture contribution |
|---|---|---|---|---|---|---|---|
| 5170 | oat flour** | 81.951% | 81.95% | 266.75 | oat flour** | 10.0% | 8.2% |
| 3828 | wheat starch # 41 | 3.961% | 3.96% | 12.89 | wheat starch # 41 | 11.0% | 0.4% |
| 4176 | sugar | 3.382% | 3.38% | 11.01 | sugar | 0.1% | 0.0% |
| 1861 | salt | 1.737% | 1.74% | 5.65 | salt | 0.1% | 0.0% |
| 2820 | calcium carbonate | 0.816% | 0.82% | 2.66 | calcium carbonate | 0.0% | 0.0% |
| 2879 | trisodium phosphate | 0.408% | 0.41% | 1.33 | trisodium phosphate | 0.0% | 0.0% |
| | Lysine | 5.000% | 5.00% | 16.28 | Lysine | 1.1% | 0.1% |
| 3776 | FloJel G | 2.000% | 2.00% | 6.51 | FloJel G | 11.0% | 0.2% |
| 5211 | Oat Fiber #2 | 0.745% | 0.75% | 2.42 | Oat Fiber #2 | 3.0% | 0.0% |
| | TOTAL DRY MIX | 100.000% | 100.00% | 325.50 | | | |
| | WATER** | | 32.50% | 156.72 | WATER** | 100.0% | 32.5% |
| | Total Dough weight | 100.000% | | 482.22 | calculated dough moisture = | | 41.4% |

**Oat Flour is measured on a 10% moisture basis. Water is adjusted according to the actual amount of oat flour scaled. See separate sheet for amount of water and oat flour to use at any oat flour moisture.
Changes to Recipe:
Lysine was substituted for 5% FloJel G

TABLE 3

SMALL SCALE PUFF (SSP) - CHOPA [LARGE BOWL]
Standard formula and procedure
Notebook Number: 10155-121002var2 (Var2)

| Code | Ingredient | % mix | % dough | Large Bowl grams | Ingredient Name | Ingredient moisture | moisture contribution |
|---|---|---|---|---|---|---|---|
| 5170 | oat flour** | 76.951% | 76.95% | 250.48 | oat flour** | 10.0% | 7.7% |
| 3828 | wheat starch # 41 | 3.961% | 3.96% | 12.89 | wheat starch # 41 | 11.0% | 0.4% |
| 4176 | sugar | 3.382% | 3.38% | 11.01 | sugar | 0.1% | 0.0% |
| 1861 | salt | 1.737% | 1.74% | 5.65 | salt | 0.1% | 0.0% |
| 2820 | calcium carbonate | 0.816% | 0.82% | 2.66 | calcium carbonate | 0.0% | 0.0% |
| 2879 | trisodium phosphate | 0.408% | 0.41% | 1.33 | trisodium phosphate | 0.0% | 0.0% |
|  | Lysine | 10.000% | 10.00% | 32.55 | Lysine | 1.1% | 0.1% |
| 3776 | FloGel G | 2.000% | 2.00% | 6.51 | FloGel G | 11.0% | 0.2% |
| 5211 | Oat Fiber #2 | 0.745% | 0.75% | 2.42 | Oat Fiber #2 | 3.0% | 0.0% |
|  | TOTAL DRY MIX | 100.000% | 100.00% | 325.50 |  |  |  |
|  | WATER** |  | 33.80% | 166.19 | WATER** | 100.0% | 33.8% |
|  | Total Dough weight | 100.000% |  | 491.69 | calculated dough moisture = |  | 42.3% |

**Oat Flour is measured on a 10% moisture basis. Water is adjusted according to the actual amount of oat flour scaled. See separate sheet for amount of water and oat flour to use at any oat flour moisture.
Changes to Recipe:
Lysine was substituted for 5% FloJel G
Oat flour was reduced from 81.951% to 76.951%

The following table and chart illustrates the results obtained by measuring the samples.
Acrylamide Results
DN/DP Var. 2=86 ppb
DN/DP Var. 1=97 ppb
DN/Oat Cereal Standard=115 ppb
Var. 2 was an oat cereal having 10% lysine added.
Var. 1 was an oat cereal having 5% lysine added.
The information from the table above is represented in FIG. 1.

Acrylamide was measured in food products using the following methodology:
Reagents and Consumables
Acrylamide (Sigma Chemical Company, St. Louis, Mo.)
$^{13}C_3$-labeled acrylamide (Cambridge Isotope Laboratory, Andover, Mass.)
HPLC grade acetonitrile (Omnisolv, EM Science, Gibbstown, N.J.)
HPLC grade methanol (Omnisolv, EM Science, Gibbstown, N.J.)
HPLC grade 2-propanol (Omnisolv, EM Science, Gibbstown, N.J.)
HPLC grade water (Omnisolv, EM Science, Gibbstown, N.J.)
Formic acid 99% (Sigma Chemical Company, St. Louis, Mo.)
Glacial acetic acid 99% (Sigma Chemical Company, St. Louis, Mo.)
Maxi-Spin filter tube, 0.45 μm PVDF (Alltech Associates, Deerfield, Ill.)
50 mL polypropylene conical tube with cap (Becton Dickinson)
Hydro-RP 80A HPLC column (2×250 mm), 4 micron packing (Phenomenex, Torrance, Calif.). Wash column a minimum of 20 min with 50:50 methanol:acetonitrile after 48 samples or at end of daily operations. Mobile phase re-equilibration for analyses will require 1.5 hr.
OASIS HLB 6 mL solid phase extraction cartridge, 200 milligram packing (Waters Corporation, Milford, Mass.).
Bond Elut—Accucat (mixed mode, C8, SAX and SCX) 3 mL solid phase extraction cartridge, 200 milligram packing (Varian Inc., Harbor City, Calif.).

Instrumentation
Agilent (Palo Alto, Calif.) Model 1100 autosampler, binary HPLC pump and column heater
Micromass Inc. (Manchester, UK), Quattro micro triple quadrupole mass spectrometer Sample Preparation
1. Crush and homogenize a portion of sample equal to the manufacturer's recommended serving size with a food processor or equivalent device.
2. Weigh a one gram portion of crushed sample into a 50 mL polypropylene graduated conical tube with cap.
3. Add 1 mL of internal standard solution ($^{13}C_3$-labeled acrylamide in 0.1% formic acid, 200 ng/mL), followed by 9 mL of water to the test portion. Shake by hand or vortex briefly to disperse test portion in water prior to step 4.
4. Mix for 20 minutes on a rotating shaker. (MN: Do not heat or sonicate, as this may generate an extract that will clog the SPE column.)
5. Centrifuge at 9000 rpm for 15 min. Promptly remove 5 mL portion of clarified aqueous phase for spin filtration and SPE. Avoid top oil layer and bottom solids layer when removing portion of aqueous phase.
6. Place 5 mL portion in Maxi-Spin filter tube, 0.45 μm PVDF (Alltech #2534). Centrifuge at 9000 rpm for 2–4 min. If filter clogs, insert new filter into tube, pour unfiltered liquid onto new filter and continue centrifugation until most of the liquid has passed through filter.
7. Condition OASIS SPE cartridge with 3.5 mL methanol, followed by 3.5 mL of water. Discard methanol and water portions used to prepare cartridge. A number of SPE cartridges were tested during development of this method, and all of them had different analyte retention and elution characteristics. Do not substitute another SPE sorbent in this step without testing.
8. Load OASIS SPE cartridge with 1.5 mL of the 5 mL test portion extract. Allow extract to pass completely through the sorbent material. Elute column with 0.5 water and discard. Elute column with additional 1.5 mL water and collect for Varian SPE cartridge cleanup. Do not use a vacuum to speed-up the elution process in any of the SPE steps.

9. Place mark on outside of Varian SPE cartridge at height of 1 mL liquid above sorbent bed. Condition Varian SPE cartridge with 2.5 mL methanol, followed by 2.5 ml of water. Discard methanol and water portions used to prepare cartridge. Load 1.5 mL portion collected in step 8 and elute to 1 mL mark before collecting remainder of eluted portion. Transfer to 2 mL autosampler vial for LC/MS/MS analysis. This step removes a number of early eluting co-extractives, resulting in better precision for sub-50 ppb measurements. Do not load more than 1.5 mL of extract onto Varian SPE cartridge.

Liquid Chromatography/Mass Spectrometry:
1. Mobile phase composition: Aqueous 0.1% acetic acid, 0.5% methanol
2. Column flow rate: 200 µL/min
3. Post-column makeup flow rate: 50 µL/min 1% acetic acid in 2-propanol
4. Injection volume: 20 µl
5. Column temperature: 26° C.
6. Acrylamide elution time: approximately 7.1 minutes
7. Ionization Mode: Positive ion electrospray
8. Probe temperature: 240° C.
9. Source temperature: 120° C.
10. Desolvation gas flow: 710 L/hr nitrogen
11. Cone Gas flow: 153 L/hr nitrogen
12. Collision gas pressure: 1 Torr argon
13. MRM ions: Acrylamide (m/z 72, 55, 27), Internal Standard (75, 58, 29). Collision energy of transitions for MRM: 72>72 and 75>75, 5 volts; 72>55 and 75>58, 10 volts; 72>27 and 75>29, 19 volts. Dwell time 0.3 sec each with 0.02 sec inter-channel and inter-scan delay.
14. Quantitation: Parts per billion acrylamide=(200 ng internal standard)(area of m/z 55)/(area of m/z 58)(g of portion analyzed)(response factor). The response factor is the average response factor obtained from a concurrently run standard curve encompassing the range of apparent acrylamide levels in the test portions. Limit of quantitation is defined as the level at which a 10:1 signal/noise ratio is observed for the analyte quantitation ion (m/z 55).

Often and potentially more important than the actual manufacture or delivery of a product is communicating the benefits associated with a particular food product to the consumers. This can be done in a number of ways such as through the preparation of scripted information or indicia that is then released to consumers. The release of such indicia is usually tailored to certain pre-selected or pre-defined formats and can be done through traditional advertising routes that have at least an audio and or visual capability such as radio and television as well printed materials. Printed materials may include the packaging into which the product is placed as well as newspapers, letters, direct mail pieces, magazines and the like.

It will thus be seen according to the present invention a highly advantageous method for reducing acrylamide levels in food products and the food products themselves has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A method for producing a food product having reduced acrylamide levels, comprising the steps of;
   preparing cooked cereal dough for use in forming a food product;
   adding about 5–10% by weight of the dough of amino acid to said dough, said amino acid being selected from the group consisting of isoleucine, phenylalanine, tyrosine, cysteine, cystine, leucine, methionine, serine, threonine, glutamate, praine, tryptophan, valine, glycine, arginine, and histidine and mixtures thereof;
   mixing said dough with said amino acid;
   heating then said dough to above 100° C. to cause said dough to undergo a Maillard reaction; and then
   drying said heated dough to provide a finished food product having a moisture content of 1–4%;
   wherein said amount of amino acid a lowers the level of acrylamide in said food product to a level lower than is present in a dough that does not contain said amount of amino acid.

2. A method as recited in claim 1, wherein the dough is prepared from grain or vegetable based ingredients.

3. A method as recited in claim 1, wherein the food product is distributed to retail and wholesale locations.

* * * * *